United States Patent
Yamauchi

Patent Number: 5,129,707
Date of Patent: Jul. 14, 1992

[54] SEATBACK FRAME HAVING RETRORSE CONNECTION OF A CONCAVE RESILIENT LUMBAR SUPPORT MEMBER

[75] Inventor: Yoshihiko Yamauchi, Ayase, Japan

[73] Assignee: Ikeda Bussan Company Ltd., Ayase, Japan

[21] Appl. No.: 716,020

[22] Filed: Jun. 17, 1991

[30] Foreign Application Priority Data

Jun. 28, 1990 [JP] Japan ............... 2-68807

[51] Int. Cl.⁵ .......................... A47C 7/02
[52] U.S. Cl. ................... 297/460; 297/216
[58] Field of Search ........... 297/460, 216, 452

[56] References Cited

U.S. PATENT DOCUMENTS

| | | | |
|---|---|---|---|
| 3,877,749 | 4/1975 | Sakurai et al. | 297/216 |
| 3,967,852 | 7/1976 | Eiselt et al. | 297/452 |
| 4,883,320 | 11/1989 | Izumida et al. | 297/284 R X |
| 4,928,334 | 5/1990 | Kita | 297/452 X |
| 5,040,848 | 8/1991 | Irie et al. | 297/460 X |
| 5,054,845 | 10/1991 | Vogel | 297/216 |

Primary Examiner—Kenneth J. Dorner
Assistant Examiner—James M. Gardner
Attorney, Agent, or Firm—Brooks & Kushman

[57] ABSTRACT

A seatback frame (21) is disclosed as having an inverted U-shaped frame member (22) including an elongated and generally horizontal upper member (23) and a pair of elongated side members (24) and (25) respectively extending generally downwardly from the extremities of the upper member. A pair of side panels (28 and 29) are respectively secured to and extend generally forwardly from each side member and have inwardly facing surfaces that oppose each other. A resilient lumbar supporting panel (35) having lateral extremities is forwardly spaced from the side members proximate the side panels and is generally concave therebetween. It has a central portion that extends generally upwardly and is secured to a central portion of the upper member. The lateral extremities form retrorse portions (41) that extend generally rearwardly along the opposed surfaces of the side panels, and the rearmost margins (43) of the retrorse portions are attached to the side panels. The resilience of the lumbar supporting panel allows the retrorse portions to flex generally about their attached margins to damp any acceleration of a passenger toward the seatback frame of vice versa.

15 Claims, 2 Drawing Sheets

SEATBACK FRAME HAVING RETRORSE CONNECTION OF A CONCAVE RESILIENT LUMBAR SUPPORT MEMBER

TECHNICAL FIELD

The present invention relates to vehicle seatback frames that are formed of inverted U-shaped frame members supporting lumbar supporting panels having portions secured to portions of upper and side members of the seatback frames.

BACKGROUND ART

Vehicle seatback frames including lumbar supporting panels supported between side members of seatback frame members are relatively common in the art. A typical seatback frame includes generally horizontal upper and lower frame members and a pair of generally vertical side members, the members being connected or continuous at their ends to form a rectangularly shaped frame.

A side panel is attached to central and lower portions of each side member and extends generally forwardly therefrom. Also included is a lumbar supporting panel extending between, and being attached to, lower portions of forward margins of the side panels. One or more resilient members, such as S-shaped springs, extend between, and are attached to, upper portions of the side members.

Attending the use of these conventional seatback frames are a number of problems. For example, following a rear-end collision that forwardly accelerates a vehicle, an associated seatback frame would be accelerated toward a passenger. The mass of the passenger would resist acceleration, resulting in an effective force being rearwardly applied to the lumbar supporting panel. The force would tend to deform the side panels, bending them inwardly toward the passenger and each other and also tending to fold the seatback frame in the same manner. Armrests attached to the side panels would, of course, be displaced therewith and possibly press against the sides of the passenger. The securing and releasing capabilities of a seatback reclining control mechanism mounted to the side panel might, when the latter is deformed, also be caused to malfunction. A similar problem would exist if the passenger sits back suddenly.

In other circumstances, for example, following a front-end collision that rapidly decelerates a vehicle, the head of a rear-seat passenger restrained within the vehicle by a lap belt might continue forward, due to inertia, in an arc described about the belt and strike the upper edge of the lumbar supporting panel of a front seat. Various garnishes and the like have been mounted on seatbacks to cushion this area, but such additions increase the production cost of the seat and the overall weight of the vehicle.

Additionally, depending on the weight, shape and posture of the occupant of a conventional seat, the space between the lumbar supporting panel and the springs could be forced apart to a point where passenger comfort is compromised.

While such seatback frames function with a certain degree of efficacy, none disclose the advantages of the present invention as is hereinafter more fully described.

DISCLOSURE OF INVENTION

An object of the present invention is to provide an improved seatback frame that absorbs forces that accelerate the seatback frame toward a passenger or vice versa and thereby damps the acceleration.

Another object of the present invention is to provide a seatback frame having side panels that are not deformed by forces that accelerate the seatback frame toward a passenger or vice versa and thereby do not displace or deform armrests or seatback reclining control mechanisms mounted to the side panels.

A further object of the present invention is to provide a seatback frame having a lumbar supporting member that presents no upper edge, within the confines of the seatback frame, against which a passenger might strike his or her head and thus requiring no additional, expensive garnish to cushion such an edge.

Still another object of the present invention is to provide a seatback frame having no gaps in its vertical, central configuration to cause discomfort to passengers having any weight, shape or posture.

In realizing the aforementioned and other objects, the present invention includes a seatback frame having an inverted U-shaped frame member. The frame member includes an elongated and generally horizontal upper member and a pair of elongated side members respectively extending generally downwardly from the extremities of the upper member.

Side panels are respectively attached to the side members, cooperatively forming side support assemblies, and extend generally forwardly therefrom. A resilient lumbar supporting panel having lateral extremities extends between the side support assemblies. The lumbar supporting panel is generally concave between the side panels and has a central portion that extends generally upwardly that is secured to a central portion of the upper member. The lateral extremities form retrorse portions that extend generally rearwardly along surfaces of the side panels, the rearmost margins of the retrorse portions being attached to the side support assemblies.

If the mass of a passenger is accelerated toward the seatback frame, such as might be the case if the passenger sat back suddenly, or, if the seatback frame is accelerated toward the passenger, such as might be the case if the vehicle is struck by another from behind, the resilience of the lumbar supporting panel allows the retrorse portion thereof to flex about its attached margin and damp relative motion between the passenger and the seatback frame.

Since the lumbar supporting member extends between the side members and also extends to the upper member, if a passenger strikes his or her head against the rear of the seatback frame between the upper member and the side members, there is no upper lumbar supporting panel edge to impact.

Also, since the lumbar supporting panel extends between the side members and also extends to the upper member, there need be no springs such as those described as being in a conventional seatback frame. There would, therefore, be no gap between a top edge of a lumbar supporting panel and springs to cause passenger discomfort.

The objects, features and advantages of the present invention are readily apparent from the following detailed description of the best mode for carrying out the invention when taken in connection with accompanying drawings.

BRIEF DESCRIPTION OF DRAWINGS

In the drawings, in which like reference characters indicate corresponding parts in all the views except FIG's. 5, 6a and 6b, which represent prior art.

Figure 2:
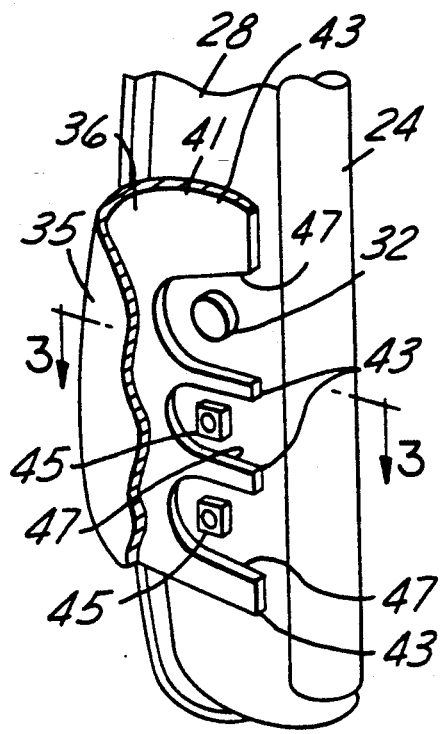
FIG. 2 is a fragmented view of a portion of the seatback frame shown by FIG. 1, providing an enlarged view of a feature thereof.
Figure 4:
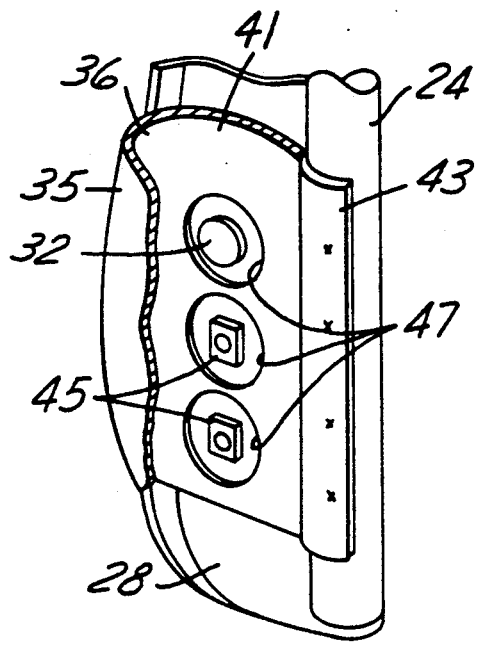
Figure 5:
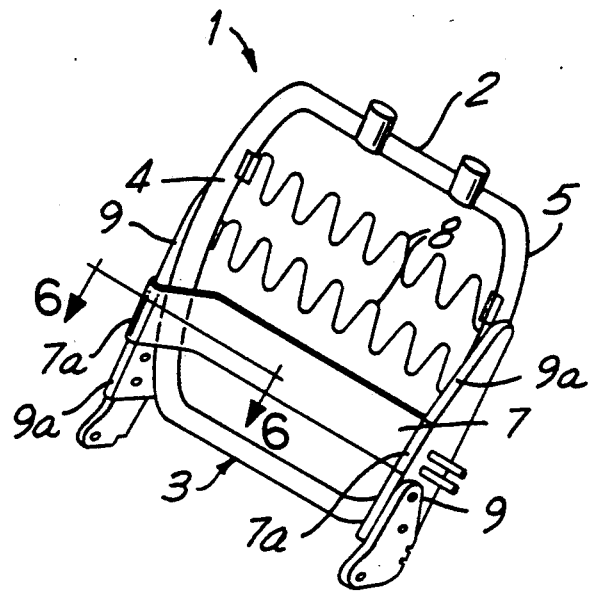

FIG'S. 3a and 3b are sectional views, taken along the line 3—3 of FIG. 2;

FIG. 4 is a view similar to that of FIG. 2, showing variations in features thereof;

FIG. 5 is a perspective view of a conventional seatback frame; and

FIG's. 6a and 6b are sectional views, taken along the line 6—6, of FIG. 5.

BEST MODE FOR CARRYING OUT THE INVENTION

Figure 1:
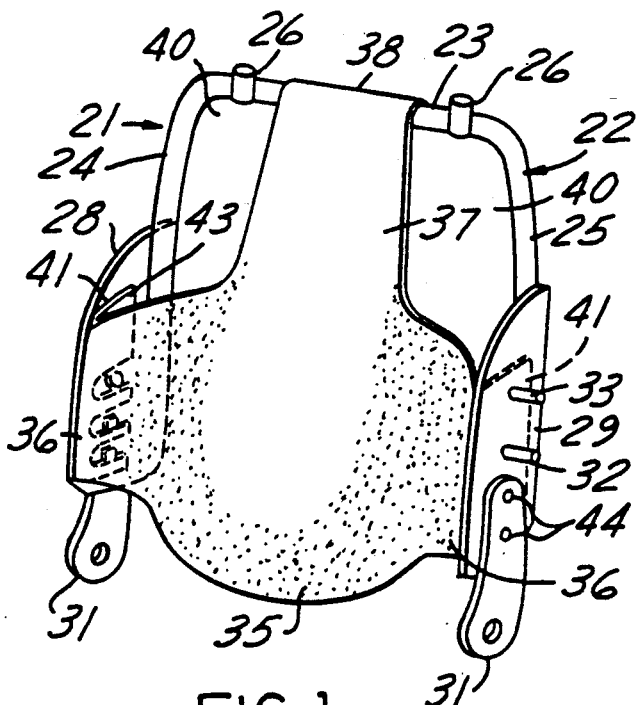
FIG. 1 of the drawings is a perspective view of a preferred embodiment of the present invention.

With reference to FIG. 1 of the drawings, shown is a perspective view of the seatback frame, generally indicated by reference numeral 21. The seatback frame 21 has an inverted U-shaped frame member 22, which may be formed from tubing or the like. The frame member 22 includes an elongated and generally horizontal upper member 23 and a pair of elongated side members 24 and 25 respectively extending generally downwardly from the extremities of the upper member 23.

Side panels 28 and 29 are secured to and extend generally forwardly from side members 24 and 25 respectively, each side panel and associated side member cooperatively forming a side support assembly. A fixed arm 31 is mounted to at least one of the side panels 28 and 29 with bolts 44. The fixed arm 31 defines a hole passing laterally therethrough to facilitate pivotally mounting the seatback frame 21 in a vehicle. A lumbar supporting panel 35, having lateral extremities and which is typically formed of a resilient material, extends between the side panels 28 and 29. The lumbar supporting panel has an extended central portion 37 that projects generally upwardly and that is secured at an upper edge 38 thereof to a central portion of the upper member 23.

As shown, the side panels 28 and 29 are shaped so that the lateral portions 36 of the lumbar supporting panel 35 are positioned well forward of a plane defined by the side members 24 and 25. This permits the lumbar supporting panel 35 to have a concave configuration in the lower portion thereof to provide lateral support for a seated occupant. As the lumbar supporting panel 35 extends upwardly, it approaches the plane defined by the side members 24 and 25 and assumes a substantially flat shape ultimately dictated by the attachment of its upper edge 38 to the upper member 23.

As is also shown, the lumbar supporting panel 35 is shaped so that the upper edge 38 of the extended central portion 37 does not extend along the entire length of the upper member 23; and the lateral portions 36 do not extend along the side members 24 and 25 to the upper member 23. This results in there being a space 40 between the lumbar supporting panel 35, the upper member 23 and the side member 24 and between the lumbar supporting panel 35, the upper member 23 and the side member 25. The spaces 40 are preferably of such a size that a passenger's head is incapable of passing therethrough.

Shown connected to the side panel 29 is an armrest pivot shaft 32, by which an armrest (not shown) may be pivotally mounted to the side panel 29, and an armrest guide pin 33, by which pivotal movement of the armrest about the pivot shaft 32 may be restricted. An armrest pivot shaft 32 and an armrest guide pin 33 may also be connected to the opposite side panel 28 in a manner similar to that shown if an armrest on each side of a seat is desired.

As also shown by FIG. 1 of the drawings, a pair of headrest brackets 26 are secured to the upper member 23 and symmetrically spaced about a central portion thereof. The headrest brackets 26 are disposed to receive and hold a headrest support (not shown) so that a headrest (not shown) may be mounted on the seatback frame 21.

With reference to FIG. 2 of the drawings, shown is a fragmented view of a portion of the seatback frame 21 shown by FIG. providing an enlarged and detailed view of portions of and about the right side member 24 and side panel 28. Included in the view are the armrest pivot shaft 32 and nuts 45 that are disposed on the bolts 44 (FIG. 1) that mount the fixed arm 31 (FIG. 1) to the side panel 28. The view shows how a rearwardly bent, or retrorse, portion 41 of the lateral portion 36 of the lumbar supporting panel 35 extends along the inner surface of the side panel 28, the rearmost margin 43 of the retrorse portion 41 of the lumbar supporting panel 35 being attached to the side panel 28 using standard means such as bolts, welds or adhesives. The retrorse portion 41 defines clearance openings 47 therein to provide space for the armrest pivot shaft 32 and the nuts 45. The clearance openings 47 can have a variety of configurations such as the semicircularly ended slots shown by FIG. 2 or the circular openings shown by FIG. 4.

Figure 3A:
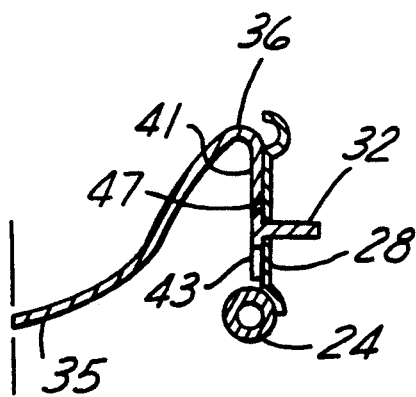
Figure 3B:
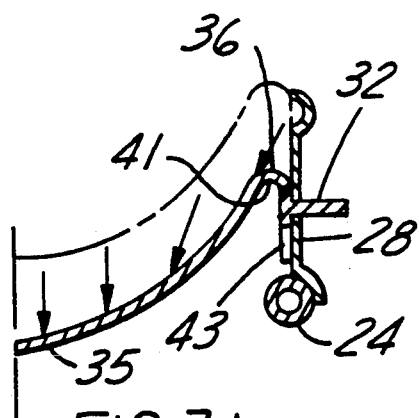

FIG. 3a is a sectional view, taken along the line 3—3, of FIG. 2 and shows the lumbar supporting panel 35 attached, at its rearmost margin 43, to the side panel 28. The lumbar supporting panel 35 is shown at rest in its normal, unstressed position, its retrorse portion 41 being disposed along the inner surface of the side panel 28. FIG. 3b is a view similar to that of FIG. 3a but showing the lumbar supporting panel 35 in a stressed position, the lumbar supporting panel 35 having been forced rearwardly resulting in the flexing especially of the lateral portion 36 and of the retrorse portion 41 away from the side panel 28. The flexing of various portions of the lumbar supporting panel 35 absorbs energy and damps relative motion between the passenger and the seatback frame 21.

Shown by FIG. 4 of the drawings is a fragmented view of a portion of the seatback frame 21 shown by FIG. 1, providing an enlarged and detailed view of portions of and about the right side member 24 and side panel 28. The view is similar to that of FIG. 2 but illustrates an embodiment wherein the rearmost margin 43 of the retrorse portion 41 of the lumbar supporting panel 35 extends to and is attached to the side member 24 rather than to the side panel 28. This places the rearmost margin 43, about which the lumbar supporting panel 35 flexes, farther back from the forwardmost part of the lateral portion 36 of the lumbar supporting panel 35, providing a longer retrorse portion 41 thereof to flex. FIG. 4 also illustrates clearance openings 47 that are circular rather than elongated, as shown by FIG. 2.

With reference to FIG. 5 of the drawings, shown is a perspective view of a conventional seatback frame, generally indicated by reference numeral 1. Generally horizontal-upper and lower frame members 2 and 3 respectively are connected at their ends to a pair of generally vertical side members 4 and 5 at their ends to form a rectangularly shaped frame.

A pair of side panels 9 are attached to the side members 4 and 5 and extend generally forwardly therefrom. Also included is a lumbar supporting panel 7 having an upper edge and extending between, and being attached to, lower portions of the side panels 9. One or more resilient members 8, such as S-shaped springs, extend between, and are attached to, upper portions of the side members 4 and 5.

Figure 6A:
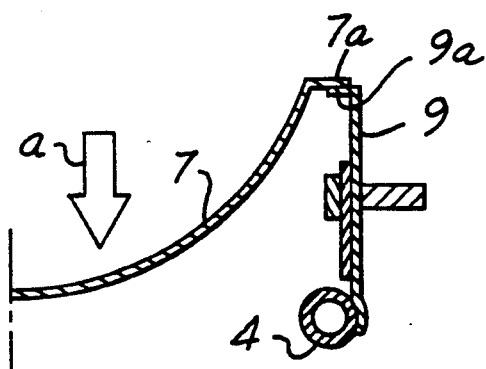
Figure 6B:
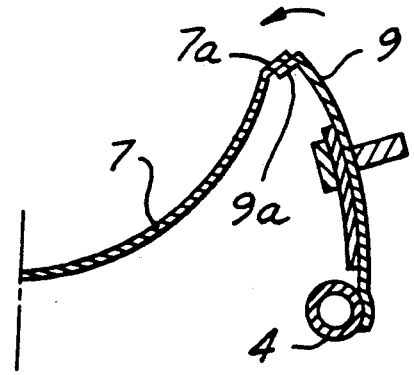

FIG. 6a is a sectional view, taken along the line 6—6, of FIG. 5 and shows the lumbar supporting panel 7 attached, at its margin 7a, to an edge 9a of the side panel 9. The lumbar supporting panel 9 is shown at rest in its normal, unstressed position. FIG. 6b is a view similar to that of FIG. 6a but showing the lumbar supporting panel 9 in a stressed position, the lumbar supporting panel 9 having been forced rearwardly resulting in the deformation of the side panel 9, bending them inwardly toward the passenger and each other and also tending to fold the seatback frame 1 in the same manner. Armrests (not shown) attached to the side panels 9 would, of course, be displaced therewith and possibly press against the sides of the passenger. The securing and releasing capabilities of a seatback reclining control mechanism (not shown) mounted to the side panel 9 might, when the latter is deformed, also be caused to malfunction.

As previously stated, attending the use of a conventional seatback frame such as that illustrated by FIG. 5 are a number of problems. For example, a seatback frame 1 would be accelerated toward a passenger following a rear-end collision that forwardly accelerates a vehicle. The mass of the passenger would resist acceleration, resulting in an effective force being rearwardly applied to the lumbar supporting panel. The force would tend to deform the side panels 9, bending them inwardly, as shown by FIG. 6b, toward the passenger and each other and also tending to fold the seatback frame 1 in the same manner. Armrests (not shown) attached to the side panels 9 would, of course, be displaced therewith and possibly press against the sides of the passenger. The securing and releasing capabilities of a seatback reclining control mechanism (not shown) mounted to the side panel 9 might, when the latter is deformed, also be caused to malfunction. A similar problem might exist if the passenger sits back suddenly.

The use of such conventional seatback frames is attended by additional problems. For example, following a frontal collision that rapidly decelerates a vehicle, the head of a rear-seat passenger restrained within the vehicle by a lap belt might continue forward, due to inertia, in an arc described about the belt and strike the upper edge 6 of the lumbar supporting panel 7 of a front seat. Various garnishes and the like can be mounted on the seatback frames to cushion this area, but such additions increase the production cost of the seat.

Additionally, depending on the weight, shape and posture of the occupant of a conventional seat, the space between the lumbar supporting panel 7 and the springs 8 could be forced apart to a point where passenger comfort is compromised.

In the present invention, since the lumbar supporting panel 35 extends between the side panels 28 and 29 and also extends to the upper member 23, if a passenger strikes his or her head against the rear of the seatback frame between the upper member 23 and the side panels 28 and 29, there is no upper lumbar supporting member edge (6 in FIG. 5) to impact.

Also, since the lumbar supporting panel 35 extends between the side members 24 and 25 and also extends to the upper member 23, there need be no springs (8 in FIG. 5) such as those described as being in a conventional seatback frame shown by FIG. 5. There would, therefore, be no gap between a top edge 6 of a lumbar supporting panel 7 and springs 8 to cause passenger discomfort.

While the best mode for carrying out the invention has been described in detail, those familiar with the art to which this invention relates will recognize various alternative designs and embodiments for practicing the invention as disclosed by the following claims.

What is claimed is:

1. A seatback frame comprising:
    an inverted U-shaped frame member including an elongated and generally horizontal upper member and a pair of elongated side members respectively extending generally downwardly from the extremities of the upper member;
    a pair of side panels respectively secured to and extending generally forwardly from each side member and having inwardly facing surfaces that oppose each other, each side member and associated side panel cooperating to form a side support assembly; and
    a lumbar supporting panel having lateral extremities extending toward the side support assemblies and having a central portion extending generally upwardly and being secured to a central portion of the upper member, the lumbar supporting panel being formed of a resilient material and being forwardly spaced from the side members proximate the side panels and being generally concave therebetween, the lateral extremities of the lumbar supporting panel forming retrorse portions that extend generally rearwardly along the opposed surfaces of the side panels, the retrorse portions including rearmost margins that are respectively attached to the side support assemblies, the resilience of the lumbar supporting panel allowing the retrorse portions to flex generally about their attached margins to damp forces acting to accelerate a passenger toward the seatback frame or vice versa.

2. The seatback frame as defined by claim 1, wherein the U-shaped frame member comprises a single piece of tubing.

3. The seatback frame as defined by claim 1, further including at least one headrest bracket secured to the upper member to receive and hold a headrest support.

4. The seatback frame as defined by claim 1, further including a fixed arm mounted to at least one side panel, the fixed arm defining a hole passing laterally therethrough to facilitate pivotally mounting the seatback frame in a vehicle.

5. The seatback frame as defined by claim 1, further including:
    an armrest pivot shaft mounted to at least one side panel to pivotally mount an armrest thereto; and an armrest guide pin mounted to the at least one side panel to limit pivotal movement of the armrest about the armrest pivot shaft.

6. A seatback frame comprising:

an inverted U-shaped frame member including an elongated and generally horizontal upper member and a pair of elongated side members respectively extending generally downwardly from the extremities of the upper member;

a pair of side panels respectively secured to and extending generally forwardly from each side member and having inwardly facing surfaces that oppose each other; and a lumbar supporting panel having lateral extremities extending toward the side panels and having a central portion extending generally upwardly and being secured to a central portion of the upper member, the lumbar supporting panel being formed of a resilient material and being forwardly spaced from the side members proximate the side panels and being generally concave therebetween, the lateral extremities of the lumbar supporting panel forming retrorse portions that extend generally rearwardly along the opposed surfaces of the side panels, the retrorse portions including rearmost margins that are attached to the side panels, the resilience of the lumbar supporting panel allowing the retrorse portions to flex generally about their attached margins to damp forces acting to accelerate a passenger toward the seatback frame or vice versa.

7. The seatback frame as defined by claim 6, wherein the U-shaped frame member comprises a single piece of tubing.

8. The seatback frame as defined by claim 6, further including at least one headrest bracket secured to the upper member to receive and hold a headrest support.

9. The seatback frame as defined by claim 6, further including a fixed arm mounted to at least one side panel, the fixed arm defining a hole passing laterally therethrough to facilitate pivotally mounting the seatback frame in a vehicle.

10. The seatback frame as defined by claim 6, further including:

an armrest pivot shaft mounted to at least one side panel to pivotally mount an armrest thereto; and an armrest guide pin mounted to the at least one side panel to limit pivotal movement of the armrest about the armrest pivot shaft.

11. A seatback frame comprising:

an inverted U-shaped frame member including an elongated and generally horizontal upper member and a pair of elongated side members respectively extending generally downwardly from the extremities of the upper member;

a pair of side panels respectively secured to and extending generally forwardly from each side member and having inwardly facing surfaces that oppose each other; and a lumbar supporting panel having lateral extremities extending toward the side panels and having a central portion extending generally upwardly and being secured to a central portion of the upper member, the lumbar supporting panel being formed of a resilient material and being forwardly spaced from the side members proximate the side panels and being generally concave therebetween, the lateral extremities of the lumbar supporting panel forming retrorse portions that extend generally rearwardly along the opposed surfaces of the side panels and proximate side members, the retrorse portions including rearmost margins that are attached to the side members, the resilience of the lumbar supporting panel allowing the retrorse portions to flex generally about their attached margins to damp forces acting to accelerate a passenger toward the seatback frame or vice versa.

12. The seatback frame as defined by claim 11, wherein the U-shaped frame member comprises a single piece of tubing.

13. The seatback frame as defined by claim 11, further including at least one headrest bracket secured to the upper member to receive and hold a headrest support.

14. The seatback frame as defined by claim 11, further including a fixed arm mounted to at least one side panel, the fixed arm defining a hole passing laterally therethrough to facilitate pivotally mounting the seatback frame in a vehicle.

15. The seatback frame as defined by claim 11, further including:

an armrest pivot shaft mounted to at least one side panel to pivotally mount an armrest thereto; and an armrest guide pin mounted to the at least one side panel to limit pivotal movement of the armrest about the armrest pivot shaft.

* * * * *